Nov. 3, 1953  G. D. BERDAN  2,657,517
CLUTCH FOR LAWN MOWERS AND TRIMMERS
Filed Dec. 16, 1950
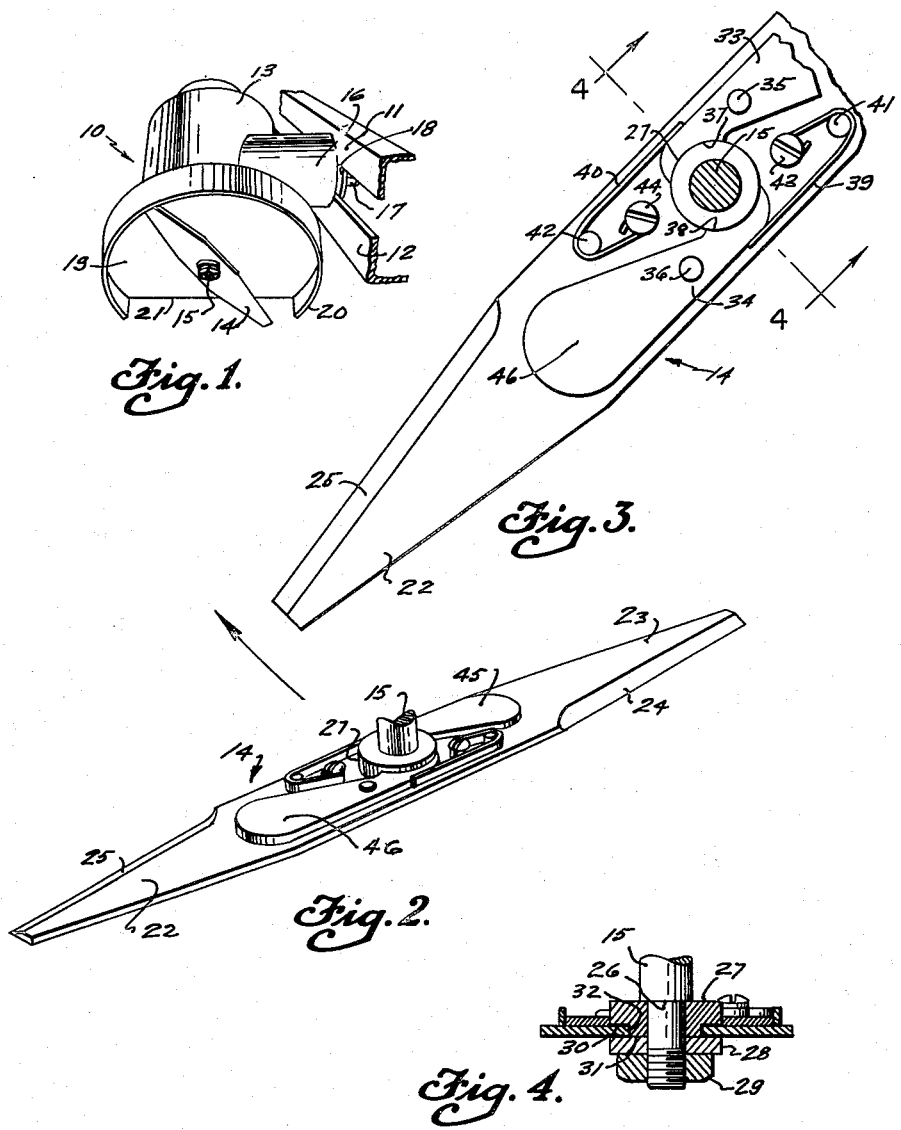
GEORGE D. BERDAN
INVENTOR
BY
ATTORNEY Patented Nov. 3, 1953

2,657,517

UNITED STATES PATENT OFFICE 2,657,517

CLUTCH FOR LAWN MOWERS AND TRIMMERS

George D. Berdan, Fort Worth, Tex.

Application December 16, 1950, Serial No. 201,121

3 Claims. (Cl. 56—295)

This invention relates to improvements in clutches for lawn mowers and lawn trimmers having rotary blades.

An object of the invention is to provide a clutch for the described purpose whereby the rotating blades may be instantly released from its drive when the blade strikes an object, such as a stone or stick in the path of the mower or trimmer.

A particular object of the invention is to adapt an inertia type clutch to a lawn mower or trimmer having a rotary blade, and yet provide for automatically re-engaging the blade on its drive after a resisting obstruction is removed from the blade.

Another object of the invention is to provide a clutch of the type referred to for driving a rotary blade which may be positioned either horizontally, vertically, or in a selected angular position, as illustrated and described in my copending application, Serial No. 194,744, filed November 9, 1950, now Patent No. 2,608,043.

The invention will be more readily understood by reference to the accompanying drawings and the following description.

Figure 1 is a perspective view of a cutter head including a driven rotary blade, and showing the same mounted between parallel guides for slidably and angularly positioning the plane of the blade relative to the surface of the lawn being mowed or trimmed.

Figure 2 is an enlarged perspective view of the top of the blade illustrated in Figure 1, and additionally showing the end of the drive upon which the blade is mounted.

Figure 3 is an enlarged broken plan view of Figure 2.

Figure 4 is a vertical sectional view taken on lines 4—4 of Figure 3.

The exemplary form of the invention shown may be included as a part of a cutter head 10 which is slidably and pivotally mounted between horizontal transverse guides 11 and 12 of a mower and trimmer, not shown, such as the one described in the referred to copending application. The cutter head 10 is comprised of a motor 13 having a flat bar or rotary blade 14 mounted on the motor shaft 15, together with a cylindrical spacer 16 mounted on the side of the motor and secured against the guides 11 and 12 by means of a stud 17 positioned therebetween. A hand knob 18 mounted on the stud 17 bears against the sides of the guides 11 and 12 opposite the spacer 16. By means of the described mounting arrangement, the plane of the blade 14 may be rotatably adjusted about the axis of the stud 17, and the entire head 10 may be positioned at any desired location along the length of the guides 11 and 12. The cutter head 10 additionally includes a D-shaped plate or guard 19 secured on the shaft end of the motor 13, and includes an arcuate flange 20 around the curved portion of its periphery. The straight side 21 of the guard 19 is positioned to permit the ends of the rotating blade 14 to project therebeyond.

The blade 14 is comprised of a flat bar having converging ends 22 and 23, together with beveled edges 24 and 25, respectively, on the leading edges thereof in accordance with the direction of rotation.

The motor shaft 15 is shouldered on its outer end, as at 26 to form a bearing, where it receives a driving collar 27 which is secured in place by means of a washer 28 and nut 29, the latter being threadedly engaged on the outermost end of the shaft 15. The periphery of the collar 27, on the side thereof opposite the shaft shoulder 26, is provided with an annular groove 30, and whereby the resulting annular projection 31 may rotatably engage a drilled opening 32 through the center of the blade. It is to be understood that the blade 14 is balanced on each side of the opening 32 so as to prevent vibration of the cutter head 10.

Clutch arms 33 and 34 are pivotally mounted, by means of pins 35 and 36, respectively, on the broad surface of the blade 14 and on opposite sides of the collar 27. The sides of the inner ends of the arms 33 and 34 are arcuately formed to provide jaws 37 and 38 for frictionally engaging the annular side of the collar 27. The engagement last referred to is augmented by means of relatively weak hairpin springs 39 and 40 mounted on pins 41 and 42, respectively, projecting from the broad surface of the blade 14. Corresponding ends of the springs 39 and 40 are secured by means of screws 43 and 44, respectively, in the blade 14, whereas the remaining ends of the springs respectively engage and bear against outer sides of the inner ends of the arms 33 and 34. The outer ends of the arms 33 and 34 are respectively enlarged so as to provide weights 45 and 46 for completing the described inertia type clutch. Preferably, the pivot pins 35 and 36 are relatively close to the inner ends of the clutch arms 33 and 34 and whereby the action of the weights 45 and 46 for frictionally engaging the jaws 37 and 38 with the collar 27 is increased.

In operation, when one of the cutting edges 24 or 25 strikes an object in the path of the mower or trimmer, the weights 45 and 46, by inertia, momentarily continue their movement; and, by reason of their pivotal mountings, release the jaws 37 and 38 from the collar 27, thus allowing the shaft 15 to turn although the blade 14 is stopped. The mower or trimmer is quickly moved away from the obstructing object, whereupon the action of the springs 39 and 40 again position the jaws 37 and 38 against the collar 27. Since the springs are relatively weak, the actuated weights 45 and 46 do not quickly reset the jaws 37 and 38, and during which time the removed operation referred to may take place.

To those versed in the art, it will be readily apparent that the invention may be adapted to flat rotary blades other than the flat bar 14 illustrated and described, and yet come within the scope of the appended claims.

What is claimed is:

1. In a lawn mower or the like having a drive shaft, a flat cutting blade mounted for relatively free rotation on said shaft, arms pivotally mounted on said blade on opposite sides of said shaft and having the pivot locations thereof relatively near said shaft, jaws in the inner ends of said arms shaped to engage the surface of said shaft, and means automatically moving said jaws inwardly to reengage said shaft after said jaws have been removed from said shaft.

2. In a lawn mower or the like having a drive shaft, a flat cutting blade mounted for relatively free rotation on said shaft, arms pivotally mounted on said blade on opposite sides of said shaft and having the pivot locations thereof relatively near said shaft, and jaws in the inner ends of said arms shaped to engage the side surface of said shaft, said mounting of said blade on said shaft having sufficient friction for overcoming the inertia of said blade when said shaft is turning.

3. In a lawn mower or the like having a drive shaft, a flat cutting blade mounted for relatively free rotation on said shaft, arms pivotally mounted on said blade on opposite sides of said shaft and having the pivot locations thereof relatively near said shaft, jaws on the inner ends of said arms shaped to engage the surface of said shaft, and springs carried by said blade and arranged to act on said arms so as to normally engage said jaws on said shaft.

GEORGE D. BERDAN.

References Cited in the file of this patent

UNITED STATES PATENTS

| Number | Name | Date |
|---|---|---|
| 627,613 | Goolman | June 27, 1899 |
| 1,430,689 | Schroeder et al. | Oct. 3, 1922 |
| 1,713,909 | Marchev | May 21, 1929 |
| 2,232,261 | Orr | Feb. 18, 1941 |
| 2,471,367 | Cavaness | May 24, 1949 |
| 2,513,798 | Hatfield | July 4, 1950 |

FOREIGN PATENTS

| Number | Country | Date |
|---|---|---|
| 18,316 | Great Britain | Aug. 7, 1914 |